US011816986B2

(12) United States Patent
Rewald et al.

(10) Patent No.: US 11,816,986 B2
(45) Date of Patent: Nov. 14, 2023

(54) METHOD FOR INCREASING THE TRAFFIC FLOW DENSITY AT A TRAFFIC LIGHT INTERSECTION

(71) Applicant: Volkswagen Aktiengesellschaft, Wolfsburg (DE)

(72) Inventors: Hannes Rewald, Braunschweig (DE); Stephan Sorgatz, Magdeburg (DE); Florian Kranke, Braunschweig (DE)

(73) Assignee: VOLKSWAGEN AKTIENGESELLSCHAFT, Wolfsburg (DE)

( * ) Notice: Subject to any disclaimer, the term of this patent is extended or adjusted under 35 U.S.C. 154(b) by 150 days.

(21) Appl. No.: 17/635,022

(22) PCT Filed: Jul. 28, 2020

(86) PCT No.: PCT/EP2020/071172
§ 371 (c)(1),
(2) Date: Feb. 14, 2022

(87) PCT Pub. No.: WO2021/028210
PCT Pub. Date: Feb. 18, 2021

(65) Prior Publication Data
US 2022/0292959 A1    Sep. 15, 2022

(30) Foreign Application Priority Data
Aug. 15, 2019 (DE) ............ 10 2019 212 263.9

(51) Int. Cl.
*G08G 1/08* (2006.01)
*G08G 1/082* (2006.01)
(Continued)

(52) U.S. Cl.
CPC ........ *G08G 1/082* (2013.01); *G08G 1/0112* (2013.01); *G08G 1/0116* (2013.01);
(Continued)

(58) Field of Classification Search
CPC ..................................................... G08G 1/082
See application file for complete search history.

(56) References Cited

U.S. PATENT DOCUMENTS

| 9,601,013 B2 * | 3/2017 | Wongpiromsarn .... G08G 1/083 |
| 9,751,506 B2 | 9/2017 | Mudalige et al. |

(Continued)

FOREIGN PATENT DOCUMENTS

| CN | 103000035 A | 3/2013 |
| DE | 102016119265 A1 | 4/2017 |

(Continued)

OTHER PUBLICATIONS

Wu, Jia et al., "Intersection Traffic Control by a Novel Scheduling Model," IEEE International Conference on Service Operations and Logistics and Informatics, pp. 329-334, Jul. 22, 2009.

(Continued)

*Primary Examiner* — Travis R Hunnings
(74) *Attorney, Agent, or Firm* — Slayden Grubert Beard PLLC

(57) ABSTRACT

A method for increasing the traffic flow density at a traffic light intersection is disclosed in which vehicles driving straight ahead and vehicles turning left may pass the traffic light intersection simultaneously, wherein the vehicles driving straight ahead are partly equipped vehicles having a Car2X communication, an automatic longitudinal control and a control unit. To increase the traffic flow density, the number of waiting vehicles turning left is transmitted to the equipped vehicles driving straight ahead. Time gaps between the vehicles driving straight ahead is set in dependence upon the number of vehicles turning left by the control unit and the automatic longitudinal control, such that a first share of the time gaps are safety time gaps, which respectively correspond to the required safety distance, and the (Continued)

second share of the time gaps are critical time gaps, which permit at least one vehicle turning left to turn collision-free.

20 Claims, 9 Drawing Sheets

(51) Int. Cl.
    *H04W 4/44*         (2018.01)
    *G08G 1/01*         (2006.01)
    *G08G 1/083*        (2006.01)
    *G08G 1/16*         (2006.01)
    *G08G 1/00*         (2006.01)

(52) U.S. Cl.
    CPC ......... *G08G 1/0133* (2013.01); *G08G 1/0145* (2013.01); *G08G 1/083* (2013.01); *G08G 1/163* (2013.01); *G08G 1/164* (2013.01); *G08G 1/166* (2013.01); *G08G 1/22* (2013.01); *H04W 4/44* (2018.02)

(56) References Cited

U.S. PATENT DOCUMENTS

| | | | |
|---|---|---|---|
| 10,081,357 | B2 | 9/2018 | Saigusa et al. |
| 10,217,357 | B1 * | 2/2019 | Elsheemy ............ G08G 1/0112 |
| 10,431,092 | B2 | 10/2019 | Buburuzan et al. |
| 10,902,719 | B2 * | 1/2021 | Baik ................. G06V 20/54 |
| 10,935,388 | B2 * | 3/2021 | Malkes ................ G08G 1/0116 |
| 11,055,991 | B1 * | 7/2021 | Mulligan ............... G08G 1/095 |
| 11,127,298 | B2 * | 9/2021 | Wang ...................... H04W 4/40 |
| RE48,781 | E * | 10/2021 | Arnold .................. H01Q 21/08 |
| 2002/0082767 | A1 * | 6/2002 | Mintz ................. G08G 1/0133 |
| | | | 340/934 |
| 2012/0095646 | A1 * | 4/2012 | Ghazarian ............... G01S 19/17 |
| | | | 340/905 |
| 2014/0210645 | A1 * | 7/2014 | Sharma .................... G08G 1/22 |
| | | | 340/907 |
| 2016/0203719 | A1 | 7/2016 | Divekar et al. ................. 701/70 |
| 2017/0372151 | A1 | 12/2017 | Diveka et al. |
| 2018/0144635 | A1 | 5/2018 | Jeon et al. |
| 2020/0126408 | A1 * | 4/2020 | Gigengack ............ B60W 30/12 |
| 2021/0043073 | A1 * | 2/2021 | Lim ........................ G06N 5/04 |

FOREIGN PATENT DOCUMENTS

| | | |
|---|---|---|
| DE | 102016209330 A1 | 11/2017 |
| DE | 102017210252 A1 | 12/2017 |
| EP | 1898381 A1 | 3/2008 |
| JP | 2969174 B1 | 11/1999 |
| JP | 2001052297 A | 2/2001 |
| WO | 2018/233175 A1 | 12/2018 |
| WO | 2021/028210 A1 | 2/2021 |

OTHER PUBLICATIONS

Dresner, Kurt, "Autonomous Intersection Management—Simulator Videos," URL: https://www.cs.utexas.edu/~aim/?p=video, 4 pages, Oct. 4, 2010.

Dresner, Kurt, "Autonomous Intersection Management—Project Homepage," URL: https://www.cs.utexas.edu/~aim/, 6 pages, Feb. 11, 2019.

German Office Action, Application No. 102019212263.9, 7 pages, dated Jul. 9, 2020.

International Search Report and Written Opinion, Application No. PCT/EP2020/071172, 9 pages, dated Dec. 1, 2020.

\* cited by examiner

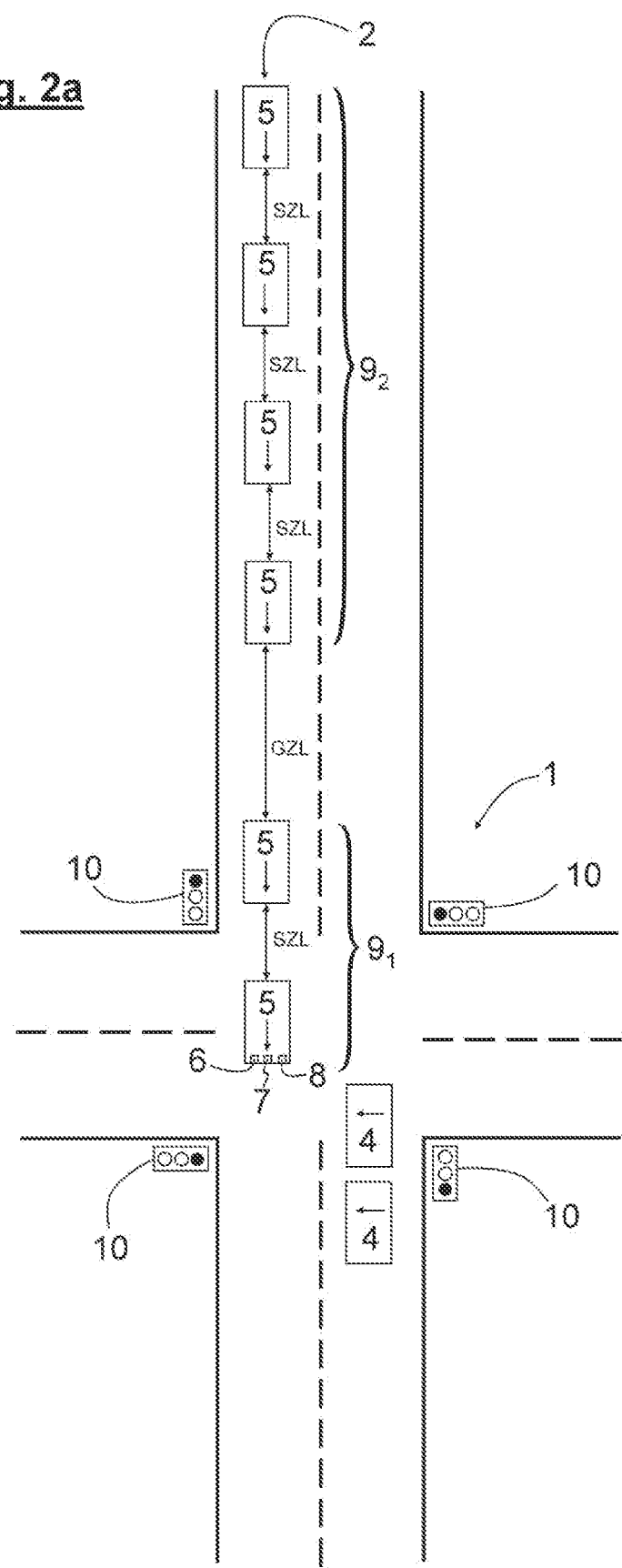

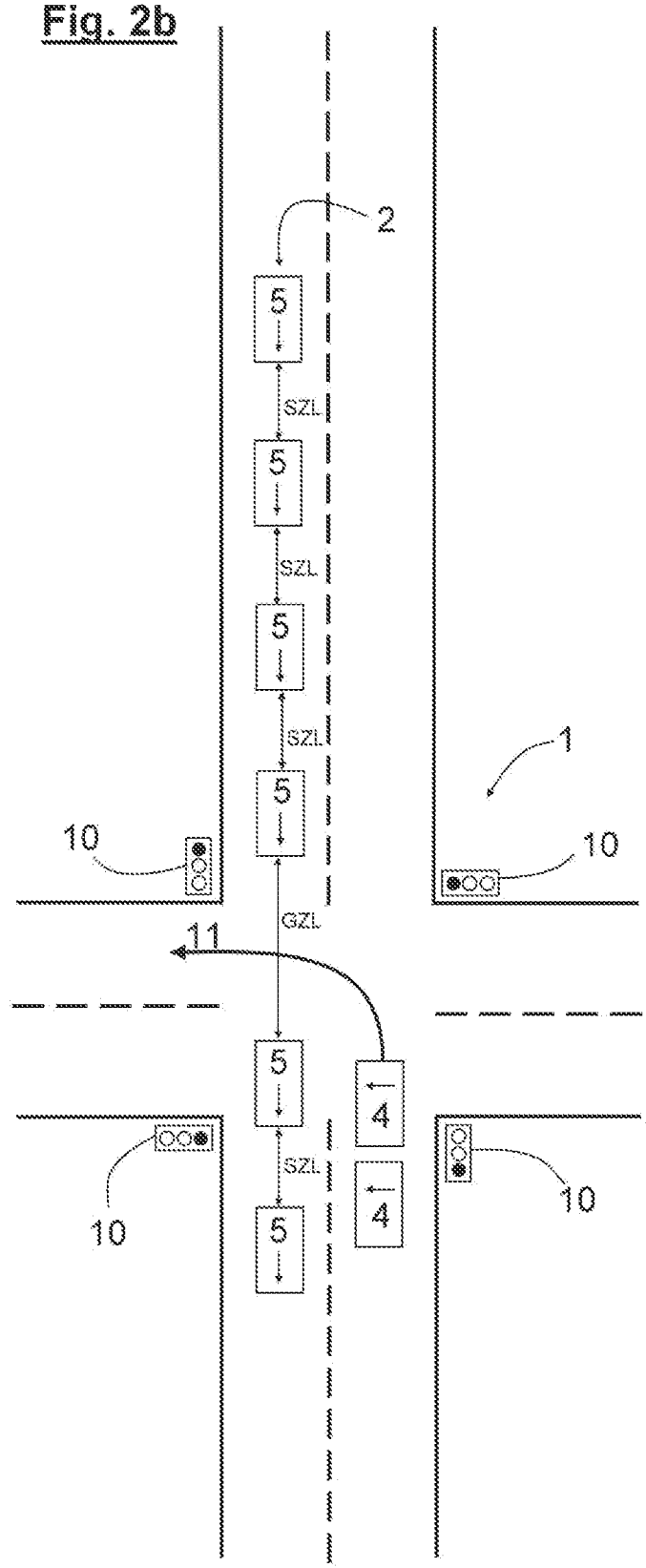

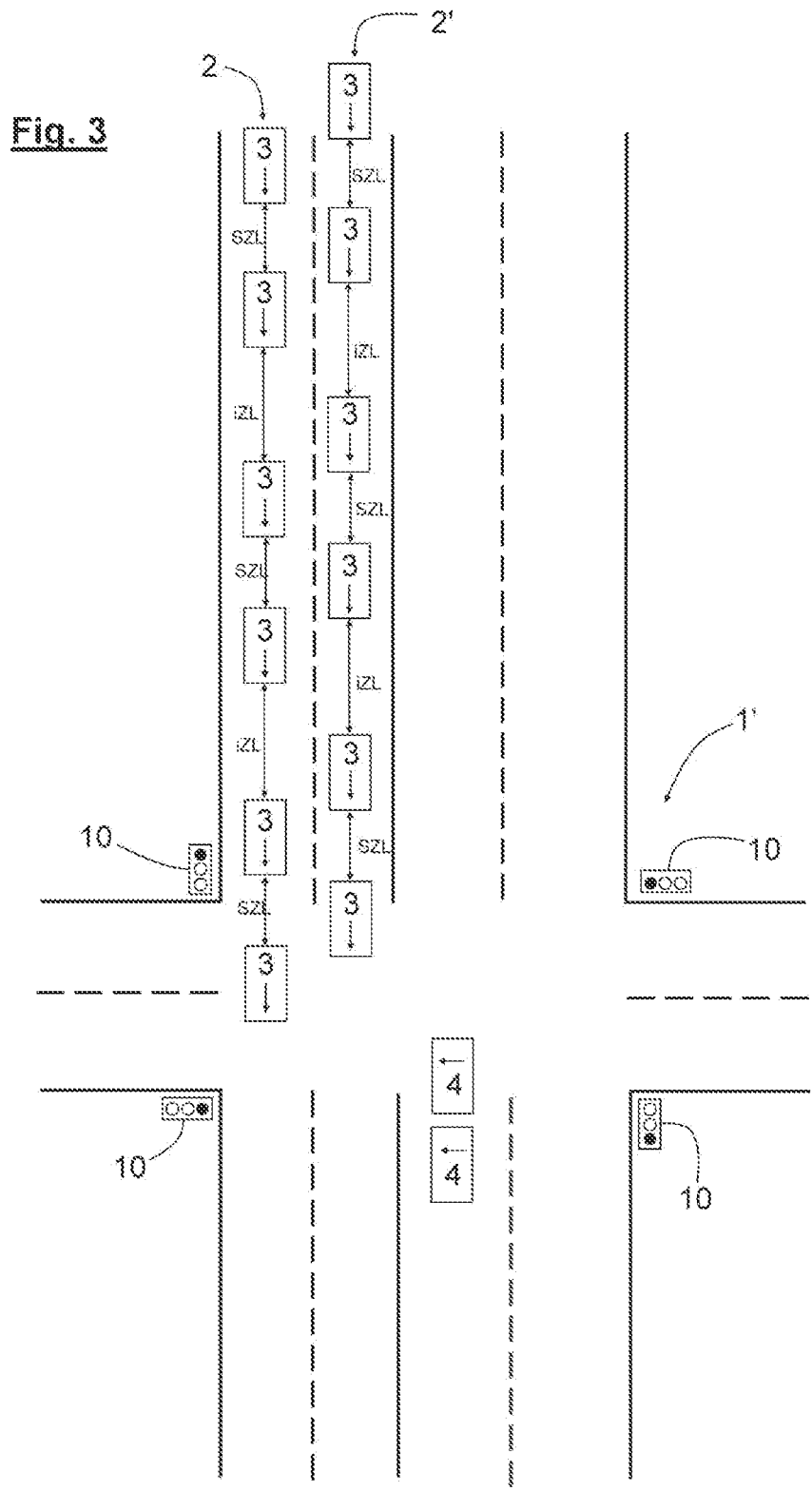

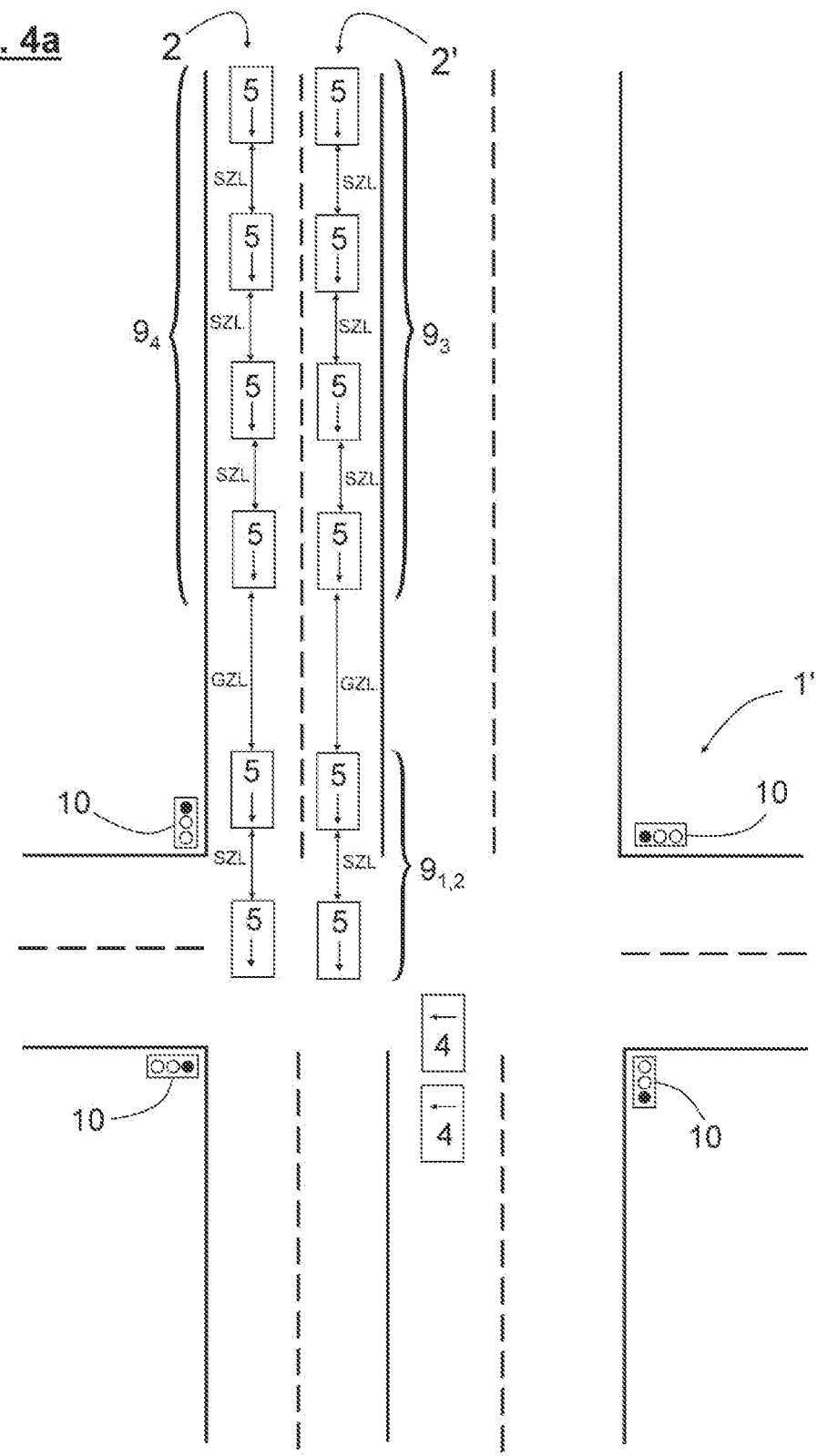

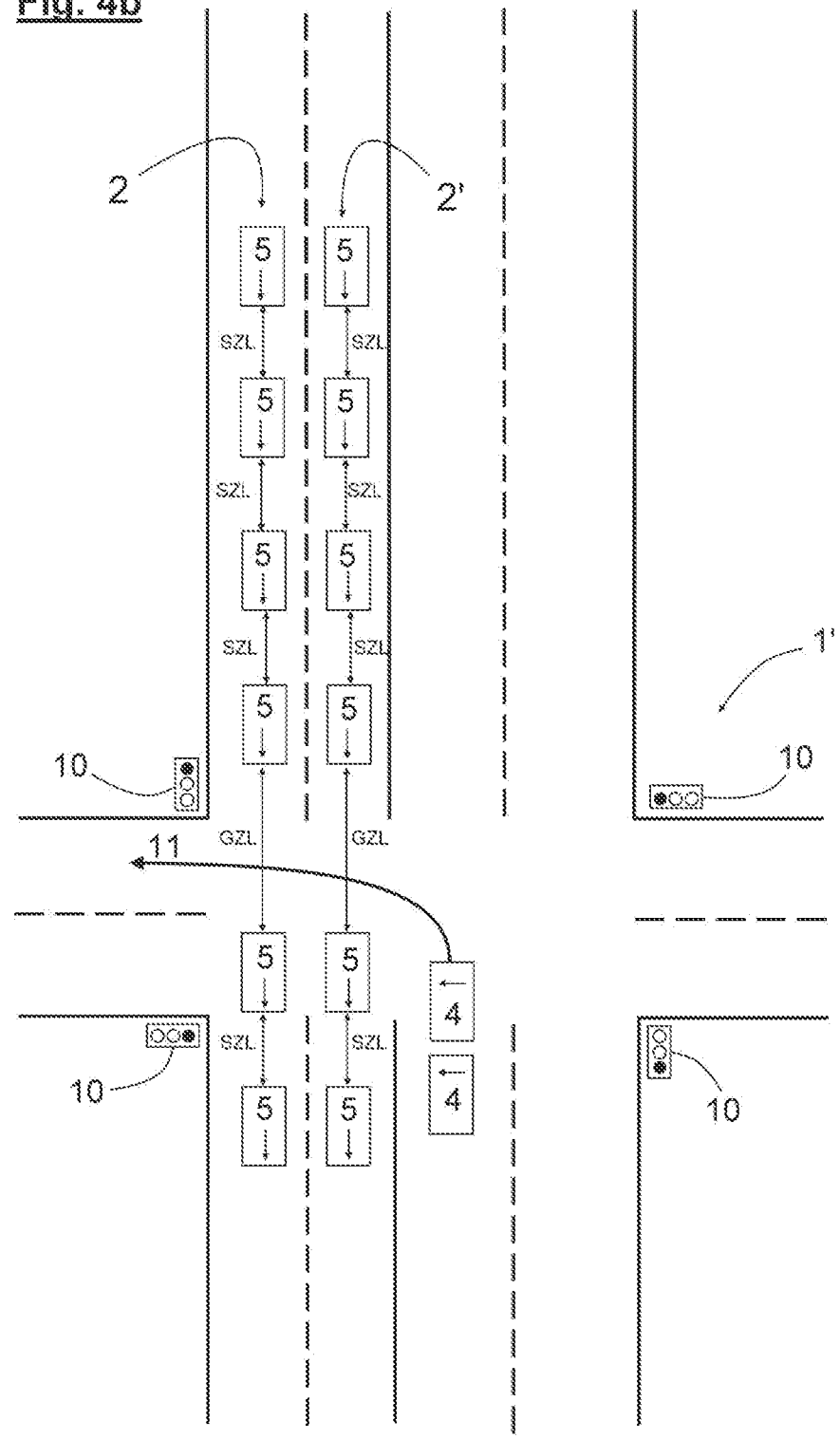

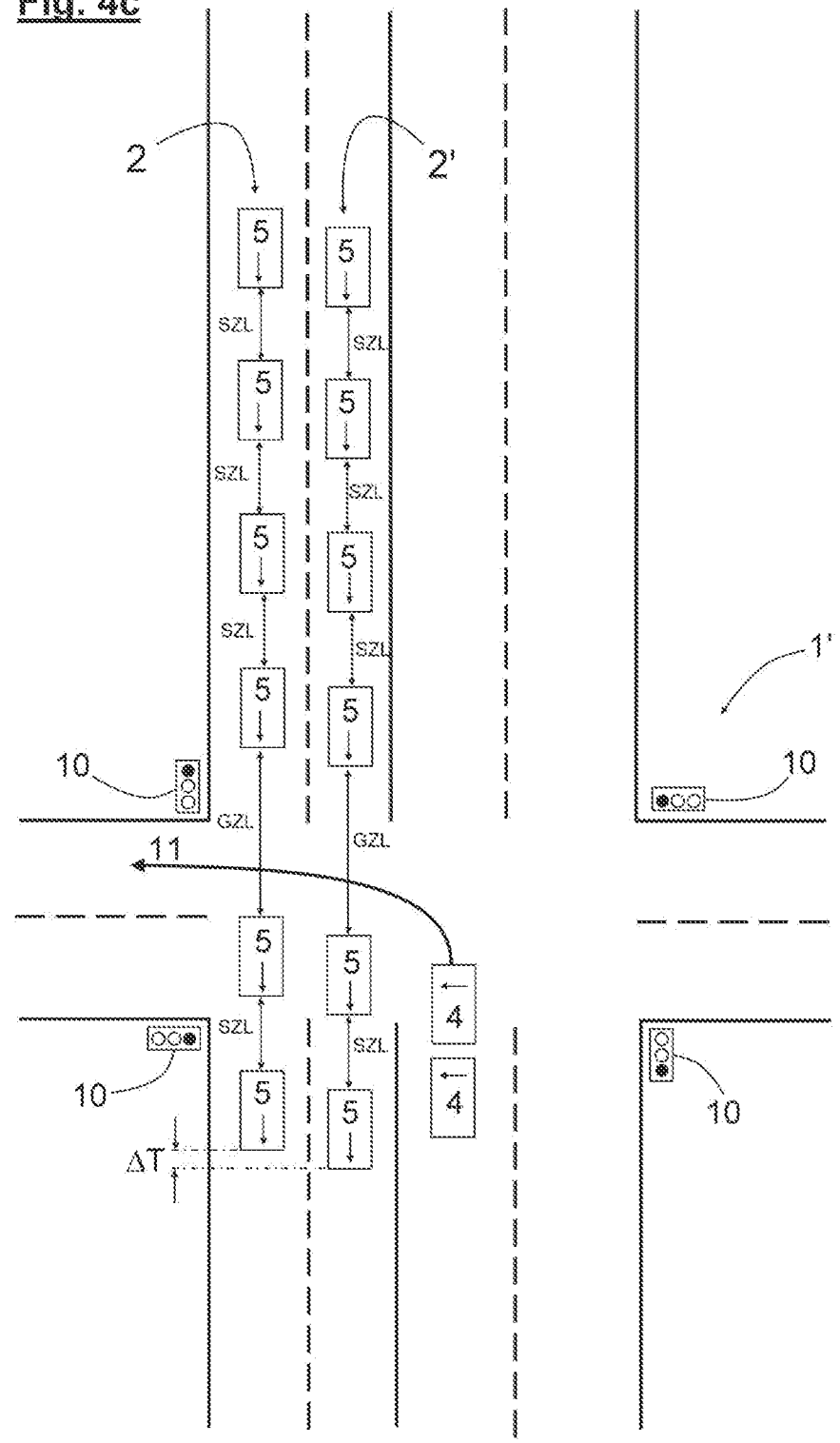

METHOD FOR INCREASING THE TRAFFIC FLOW DENSITY AT A TRAFFIC LIGHT INTERSECTION

CROSS-REFERENCE TO RELATED APPLICATIONS

This application claims priority to German Patent Application No. DE 10 2019 212 263.9, filed on Aug. 15, 2019 with the German Patent and Trademark Office. The contents of the aforesaid Patent Application are incorporated herein for all purposes.

TECHNICAL FIELD

The present invention relates to a method for increasing the traffic flow density at a traffic light intersection with a traffic light phase in which vehicles driving straight ahead and vehicles turning left can simultaneously pass the traffic light intersection, wherein the vehicles driving straight ahead have the right of way in conformity with traffic regulations and are, at least in part, equipped vehicles having a Car2X communication, an automatic longitudinal control and a control unit.

BACKGROUND

This background section is provided for the purpose of generally describing the context of the disclosure. Work of the presently named inventor(s), to the extent the work is described in this background section, as well as aspects of the description that may not otherwise qualify as prior art at the time of filing, are neither expressly nor impliedly admitted as prior art against the present disclosure.

The constant development of autonomous driving and with it, the increasing automation of road traffic, enables an increase in traffic flow density, i.e., the number of vehicles that pass a certain position per unit of time, by automated coordination of processes in various traffic situations. Communication channels, such as Car2X communication, are known for this purpose.

Traffic light intersections with a traffic light phase in which vehicles driving straight ahead and vehicles turning left are permitted to simultaneously pass the traffic light intersection are additional constrictions in road traffic, which result in significant impairments of the traffic flow density, especially in the left-turning lane. The vehicles turning left must therefore wait for a sufficiently large gap in the oncoming traffic driving straight ahead before they can pass the intersection.

Based on experience, the durations of the time gaps in the oncoming traffic stream are statistically distributed, wherein essentially the following categories can be defined.

First, few time gaps of less than is are ascertainable, being shorter than the safety distance prescribed per se in accordance with road traffic regulations.

A large share of traffic participants, however, maintain a sufficient safety distance and therefore a safety time gap of 1 s to 2 s.

However, a not insignificant share of traffic participants maintain a distance to the vehicle driving ahead between 2 s and 6.5 s, which as such is significantly greater than the required safety distance, which does not permit a traffic participant in the lane of vehicles turning left to turn left collision-free. Such time gaps in the road traffic are therefore to be identified as inefficient time gaps.

Only a small fraction of traffic participants maintain a critical time gap to vehicles driving ahead that allows at least one vehicle to turn left collision-free.

In both the stream of the vehicles driving straight ahead as well as in the stream of the vehicles turning left, the number of inefficient time gaps results in significant delays, by which the achievable traffic density per se in both lanes is significantly reduced. Moreover, inefficient time gaps negatively impact fuel consumption and emitted emissions.

SUMMARY

A need exists to provide a method for increasing the traffic flow density and for reducing fuel consumption and emissions.

The need is addressed by the subject matter of the independent claim(s). Embodiments of the invention are described in the dependent claims, the following description, and the drawings.

BRIEF DESCRIPTION OF THE DRAWINGS

FIG. 2a, b respectively show an exemplary two-lane traffic light intersection with two convoys of vehicles driving straight ahead and two vehicles turning left;

FIG. 3 shows an exemplary four-lane traffic light intersection with two lines of vehicles driving straight ahead and two vehicles turning left with time gaps;

FIG. 4a, b, c respectively show an exemplary four-lane traffic light intersection with four laterally synchronized convoys and two vehicles turning left.

DESCRIPTION

Figure 1:
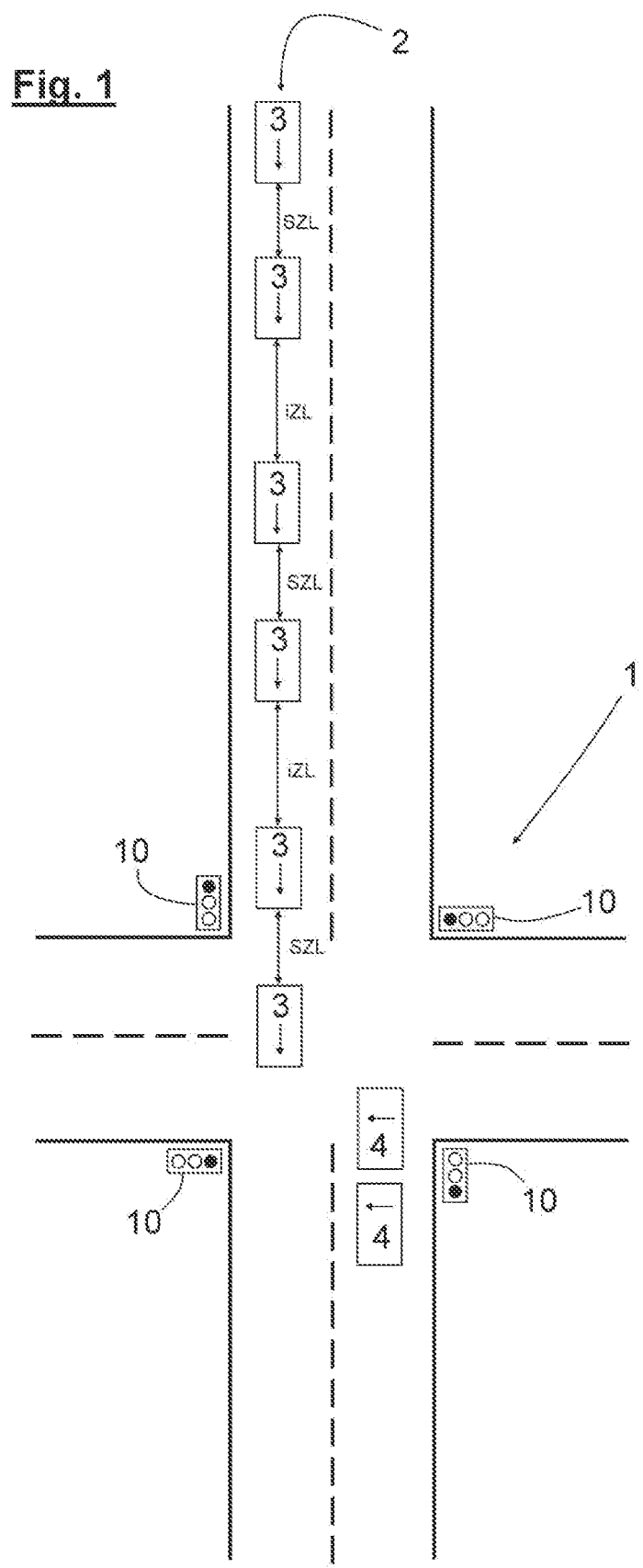
FIG. 1 shows an exemplary two-lane traffic light intersection with a line of vehicles driving straight ahead and two vehicles turning left with time gaps.

The details of one or more embodiments are set forth in the accompanying drawings and the description below. Other features will be apparent from the description, drawings, and from the claims.

In the following description of embodiments of the invention, specific details are described in order to provide a thorough understanding of the invention. However, it will be apparent to one of ordinary skill in the art that the invention may be practiced without these specific details. In other instances, well-known features have not been described in detail to avoid unnecessarily complicating the instant description.

In some embodiments, it is provided that first the number of waiting vehicles turning left is transmitted to the equipped vehicles driving straight ahead by means of Car2X communication. Next, the time gaps between the vehicles driving straight ahead is set by means of the control unit and the automatic longitudinal control in dependence upon the number of vehicles turning left, such that a first share of the time gaps are safety time gaps, which respectively correspond to the required safety distance and the second share of the time gaps are critical time gaps, which permit at least one vehicle turning left to turn collision-free. Because the inefficient time gaps are either enlarged to critical time gaps or shortened to safety time gaps as the case may be, the traffic flow density in the stream of the vehicles driving straight ahead is ideally increased and otherwise only reduced insignificantly at most. Conversely, the traffic flow densities in the stream of vehicles turning left can be significantly increased, which increases the efficiency of such a traffic light intersection many times over.

Various embodiments are provided in the following and in the dependent claims.

In some embodiments, it is provided that inefficient time gaps longer than the safety time gaps and shorter than the critical time gaps are shortened to safety time gaps or extended to critical time gaps by an automatic longitudinal guidance of the equipped vehicles driving straight ahead. In this context, the equipped vehicles can be accelerated to shorten the time gaps or braked to enlarge the time gaps.

The critical time gaps are for example set as efficient critical time gaps, which permit the turning of a single or multiple left-turning vehicles. Critical time gaps that are, on the one hand, significantly too long to permit a vehicle turning left to turn collision-free and on the other hand, which are too short to permit two vehicles turning left to turn collision-free, are extended or shortened into efficient critical time gaps as needed through the longitudinal guidance of the equipped vehicles.

In some embodiments, it is provided that the vehicles driving straight ahead form a line, the length of which is not or is only insignificantly changed by setting or changing the internal time gaps between individual vehicles to safety time gaps and/or critical time gaps. As a result of this, the traffic flow density in the lane of the vehicles driving straight ahead is not affected and can be essentially preserved.

In some embodiments, it is provided for controlling the method that the line of the vehicles driving straight ahead forms multiple vehicle convoys, wherein the time gaps between vehicles of a vehicle convoy are safety gaps, such that the critical time gaps are formed between two vehicle convoys. In this context, it is for example provided that the number of vehicle convoys per line $N_{FK}$ of vehicles driving straight ahead is adjusted to the number of vehicles turning left $N_{IaF}$, wherein for example the following is true for the number of vehicle convoys $N_{FK}$ and the number $N_{IaF}$ of waiting vehicles turning left:

$$N_{FK} = N_{IaF} + 1.$$

Insofar as due to the prevailing traffic situation there is a disproportionately high number of waiting vehicles turning left, admittedly not every time gap between the equipped vehicles is expanded into critical time gaps, since the preservation of the traffic flow density in the stream of vehicles driving straight ahead has priority. In such a situation, merely suitable inefficient time gaps are extended into critical time gaps, such that the length of the line of vehicles driving straight ahead is not or is only insignificantly changed.

Because non-equipped vehicles that do not have Car2X communication or automatic longitudinal control also participate in road traffic along with equipped vehicles, it is provided according to some embodiments that a group of multiple equipped vehicles that are following a non-equipped vehicle form a convoy. In this context, the convoy leader is set up to determine the distance between the vehicle driving ahead and the vehicle driving ahead of that vehicle, such that the convoy leader sets a safety gap or a critical time gap to the vehicle driving ahead, as needed. In other words, the convoy leader is set up to determine the distance of at least two vehicles driving ahead. If the distance between the two vehicles driving ahead does not correspond to a critical time gap, the equipped vehicle defined as convoy leader sets a critical time gap to the vehicle driving immediately ahead, if needed.

It may be provided that the traffic light intersection is also equipped with a Car2X communication, such that the traffic light intersection is able to inform the vehicles driving straight ahead of the number of vehicles turning left. In particular, sensor devices are provided with which the traffic light intersection can additionally determine whether non-equipped vehicles are among waiting vehicles turning left, such that corresponding critical time gaps in the stream of the vehicles driving straight ahead can be set for these vehicles as well.

The assignment of the vehicles driving straight ahead to convoys is for example performed before they cross the traffic light intersection and the assignment of the vehicles into convoys is terminated after they cross the traffic light intersection. Thus, merely a temporary assignment of the vehicles to convoys results and the automatic longitudinal control engages only when approaching a traffic light intersection and while driving through it. Other than this, the longitudinal control of the vehicles is controlled in another manner, such as by the drivers of the vehicles themselves.

In the case of traffic light intersections with two or more lanes for vehicles driving straight ahead, for example a lateral—i.e., a sideways—synchronization of the vehicles is provided, especially of the vehicle convoys, such that the critical time gaps are arranged parallel to one another or are arranged staggered at an offset $\Delta T$ to one another, which permits at least one vehicle turning left to turn collision-free in the case of traffic light intersections with four or more lanes. The lateral synchronization is also performed before crossing the traffic light intersection and terminated after crossing the traffic light intersection.

Further embodiments of the present invention are explained in the following with reference to the FIGS. Specific references to components, process steps, and other elements are not intended to be limiting. Further, it is understood that like parts bear the same or similar reference numerals when referring to alternate FIGS.

The initial situation at traffic light intersections known from the prior art is shown in FIG. 1. The traffic light intersection of a two-lane road has multiple traffic lights 10 and is driven through by a line 2 of vehicles driving straight ahead 3, wherein there are different time gaps between the vehicles 3. Predominantly there are comparatively short distances and therefore safety time gaps SZL. In two cases, however, there are inefficient distances between the vehicles 3, from which results inefficient time gaps iZL that block the collision-free turning of a vehicle turning left and lengthen the line 2 of vehicles driving straight ahead 3 without any evident reason. In the situation shown, the vehicles turning left 4 must wait until the line 2 of vehicles driving straight ahead 3 has passed the traffic light intersection 1, which reduces the traffic flow density among the vehicles turning left 4.

FIGS. 2a and 2b show the method sequence according to the teachings herein at the traffic light intersection 1 of the two-lane road. The traffic light intersection 1 is crossed by a line 2 of equipped vehicles 5, which have a Car2x communication 6, a control unit 7 and an automatic longitudinal control 8 (in FIG. 2a, only shown as an example on a vehicle 5). The number $N_{IaF}$ of waiting vehicles turning left 4 is transmitted to the equipped vehicles 5 in the line 2 via a Car2X communication 6. In this context, the Car2X communication 6 can take place through suitable communication apparatuses of the traffic light intersection 1 or of the vehicles turning left 4, provided these vehicles are equipped vehicles or at least have a Car2X communication. Next, the inefficient time gaps iZL within the line 2 of vehicles driving straight ahead 5 are identified and localized. In dependence upon the number $N_{IaF}$ of vehicles turning left 4, convoys 9 are then formed and the time gaps between vehicles of a convoy 9 are set respectively to a safety time gap SZL by means of the automatic longitudinal control. In the exemplary embodiment shown, two convoys $9_1$, $9_2$ have formed. A critical time gap GZL is set between the convoys $9_1$, $9_2$ which permits a vehicle 4 to turn left in an arrow direction 11 collision-free once the critical time gap is abreast of the traffic light intersection 1 (FIG. 2b). While this occurs, the length of the line 2 of vehicles driving straight ahead 5 is not enlarged, whereby the traffic flow density of the vehicles driving straight ahead 5 can be maintained and the traffic flow density of the vehicles turning left 4 can be increased.

Analogous to FIG. 1, FIG. 3 shows the traffic situation according to the prior art at a traffic light intersection 1' of a four-lane road. Two parallel rows 2, 2' of vehicles driving straight ahead 3 that want to cross the traffic light intersection 1' are shown. Due to the irregular distances and time gaps between the individual vehicles 3, it is not possible for the two vehicles turning left 4 to turn left collision-free. The vehicles turning left must therefore yield the right of way and wait until both rows 2, 2' have fully crossed the traffic light intersection 1'.

FIGS. 4a, 4b, and 4c show the method sequence according to the teachings herein, according to which the two rows 2, 2' of equipped vehicles driving straight ahead 5 first form convoys $9_1$, $9_2$, $9_3$, $9_4$ and critical time gaps GZL are set between the convoys $9_1$, $9_2$, $9_3$, $9_4$. In addition, the two rows 2, 2' synchronize laterally, such that the vehicles 5 and especially the critical time gaps GZL are abreast of one another (FIG. 4a, b) or slightly offset from one another (FIG. 4c), which permits a vehicle turning left 4 to turn left in the arrow direction 11 collision-free (FIG. 4b). The minor offset ΔT between the lines 2, 2' according to FIG. 4c takes into account the fact that the (left) line 2 has already moved on in the direction of travel, while the vehicle turning left 4 drives through the critical time gap GZL of line 2'. To this extent, such an offset ΔT of the laterally synchronized lines 2, 2' promotes collision-free turning and furthermore permits significantly more than two lines of vehicles driving straight ahead 5 to turn collision-free.

Figure 5A:
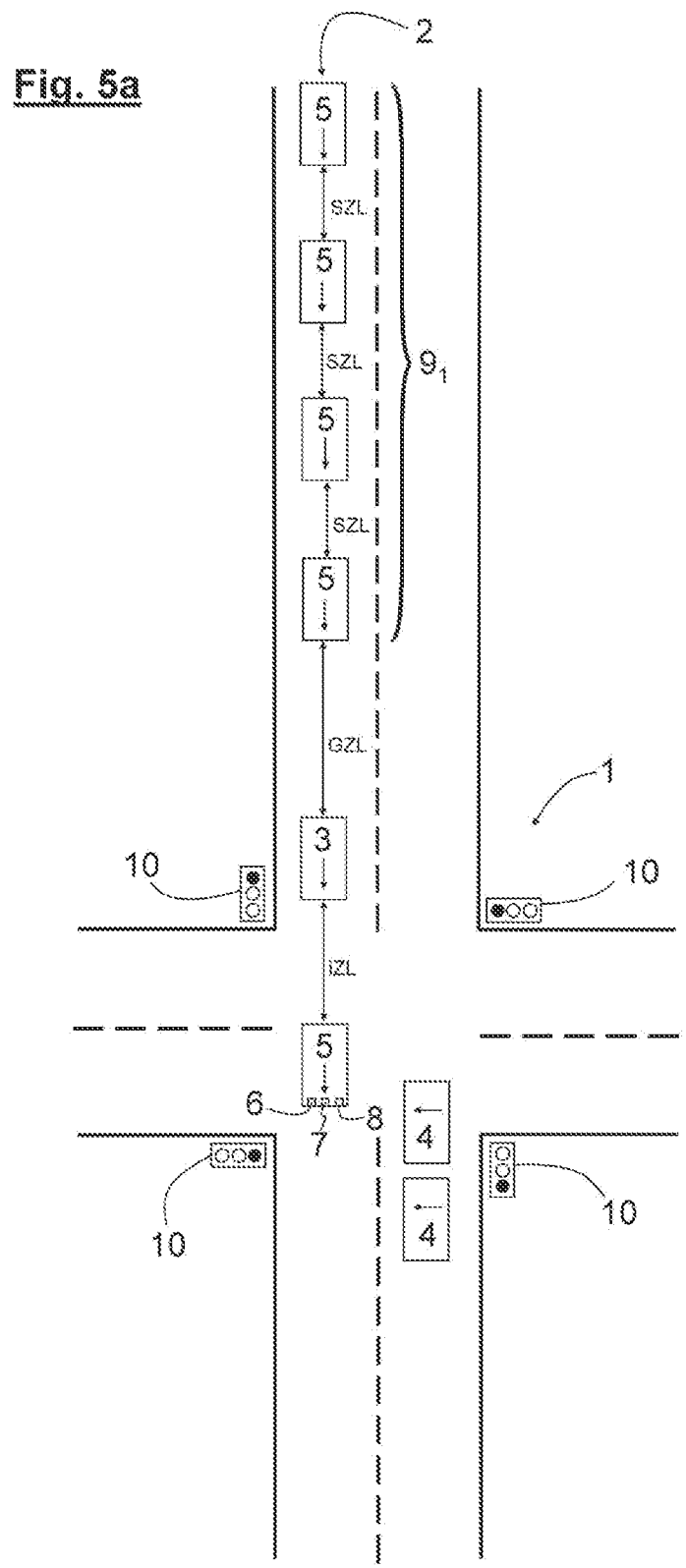
FIG. 5a, b respectively show an exemplary two-lane traffic light intersection with a line of equipped vehicles driving straight ahead and a non-equipped vehicle.
Figure 5B:
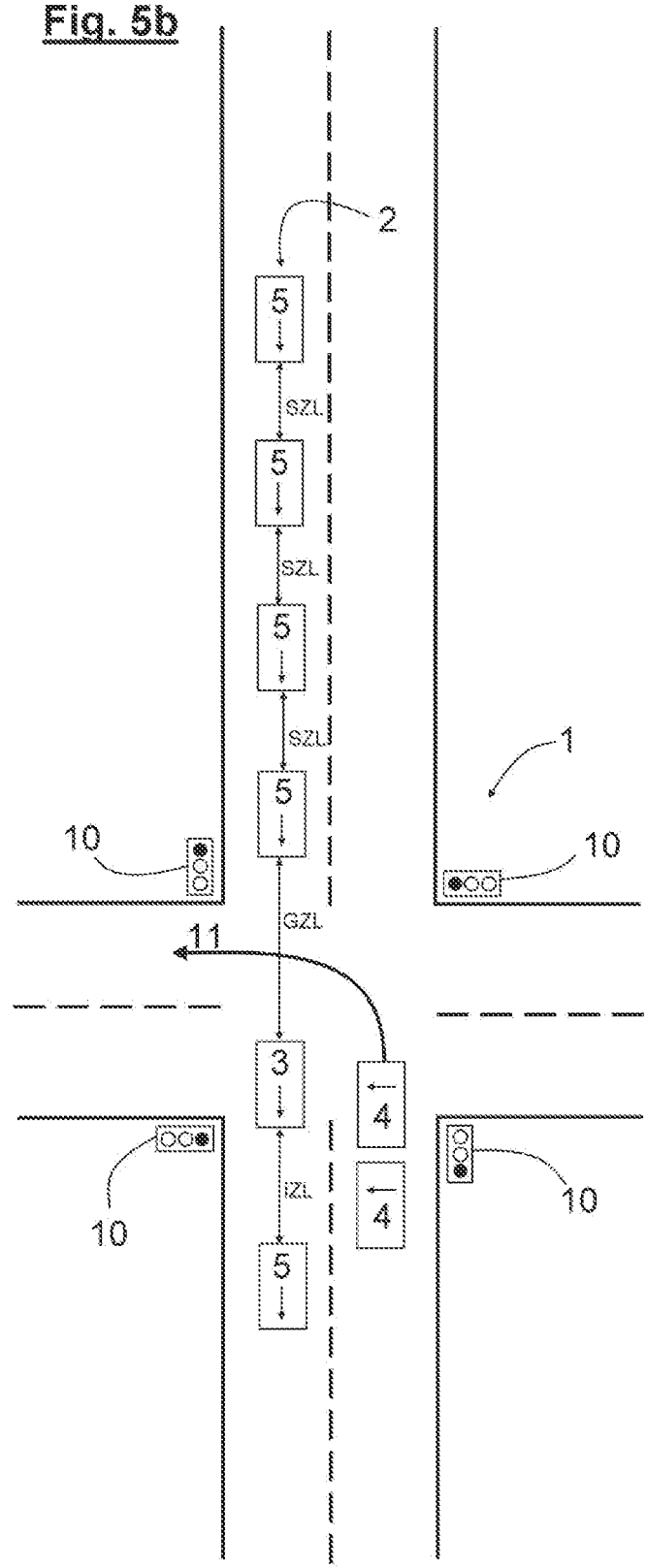

FIGS. 5a, and 5b show the case in which, aside from equipped vehicles 5, at least one non-equipped vehicle 3 is also present in the line 2 of vehicles driving straight ahead. The equipped vehicles 5 following the non-equipped vehicle 3 are defined as a convoy $9_1$ with safety time gaps SZL between the vehicles 5 and the convoy leader maintains a critical time gap GZL due to the waiting vehicles turning left 4, which permits a vehicle 4 to turn left collision-free (FIG. 5b).

The present description applies to driving on the right. For driving on the left, the discussed directions of travel are to be adapted to the corresponding provisions of the applicable road traffic regulations.

LIST OF REFERENCE NUMERALS 1, 1' Traffic light intersection
2, 2' Line
3 Vehicles driving straight ahead
4 Vehicles turning left
5 Equipped vehicles driving straight ahead
6 Car2x communication
7 Control unit
8 Automatic longitudinal control
$9_{1, \ldots, 4}$ Convoys
10 Traffic light
11 Arrow direction
$N_{FK}$ Number of convoys
$N_{IaF}$ Number of vehicles turning left
SZL Safety time gaps
iZL Inefficient time gaps
GZL Critical time gaps
ΔT Offset The invention has been described in the preceding using various exemplary embodiments. Other variations to the disclosed embodiments may be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor, module or other unit or device may fulfil the functions of several items recited in the claims.

The term "exemplary" used throughout the specification means "serving as an example, instance, or exemplification" and does not mean "preferred" or "having advantages" over other embodiments. The term "in particular" used throughout the specification means "serving as an example, instance, or exemplification".

The mere fact that certain measures are recited in mutually different dependent claims or embodiments does not indicate that a combination of these measures cannot be used to advantage. Any reference signs in the claims should not be construed as limiting the scope.

What is claimed is:

1. A method for increasing the traffic flow density at a traffic light intersection with a traffic light phase in which vehicles driving straight ahead and vehicles turning left may pass the traffic light intersection simultaneously, wherein the vehicles driving straight ahead have the right of way in conformity with traffic regulations and are, at least in part, equipped vehicles having a Car2X communication, an automatic longitudinal control, and a control unit, comprising:
   transmitting the number of waiting vehicles turning left $N_{IaF}$ to the equipped vehicles driving straight ahead using the Car2X communication; and
   setting time gaps between the vehicles driving straight ahead in dependence upon the number of vehicles turning left using the control unit and the automatic longitudinal control, such that a first share of the time gaps are safety time gaps, which respectively correspond to a required safety distance, and a second share of the time gaps are critical time gaps, which permit at least one vehicle turning left to turn collision-free.

2. The method of claim 1, comprising shortening inefficient time gaps that are longer than the safety time gaps and shorter than the critical time gaps to safety time gaps or extending to critical time gaps through an automatic longitudinal control of the equipped vehicles driving straight ahead.

3. The method of claim 1, comprising setting the critical time gaps as efficient critical time gaps that permit a single vehicle turning left or multiple vehicles turning left to turn.

4. The method of claim 1, wherein the vehicles driving straight ahead form a line, the length of which is not or is only insignificantly changed by the setting or changing of the time gaps within the line between individual vehicles as safety time gaps and/or critical time gaps.

5. The method of claim 1, wherein the line of the vehicles driving straight ahead forms multiple vehicle convoys, wherein the time gaps between vehicles of a vehicle convoy are safety time gaps, such that the critical time gaps are formed between two vehicle convoys.

6. The method of claim 1, comprising adjusting the number of vehicle convoys $N_{FK}$ per line of vehicles driving straight ahead to the number of vehicles turning left.

7. The method of claim 1, wherein a group of multiple equipped vehicles that are following a non-equipped vehicle form a convoy, wherein the convoy leader is configured to determine the distance between the vehicle driving ahead and the vehicle driving ahead of that vehicle, such that the convoy leader sets a safety time gap or a critical time gap to the vehicle driving ahead, as needed.

8. The method of claim 1, wherein the traffic light intersection is equipped with a Car2X communication.

9. The method of claim 1, wherein the assignment of the vehicles driving straight ahead to convoys is performed before crossing the traffic light intersection and the assignment of the vehicles to convoys is terminated after crossing the traffic light intersection.

10. The method of claim 1, wherein for traffic light intersections with two or more lanes for vehicles driving straight ahead, a lateral synchronization of the vehicles occurs, especially of the vehicle convoys, such that critical time gaps are arranged parallel to one another or are arranged staggered at an offset to one another, which permits at least one vehicle turning left to turn collision-free at traffic light intersections with two or more lanes.

11. The method of claim 2, comprising setting the critical time gaps as efficient critical time gaps that permit a single vehicle turning left or multiple vehicles turning left to turn.

12. The method of claim 2, wherein the vehicles driving straight ahead form a line, the length of which is not or is only insignificantly changed by the setting or changing of the time gaps within the line between individual vehicles as safety time gaps and/or critical time gaps.

13. The method of claim 3, wherein the vehicles driving straight ahead form a line, the length of which is not or is only insignificantly changed by the setting or changing of the time gaps within the line between individual vehicles as safety time gaps and/or critical time gaps.

14. The method of claim 2, wherein the line of the vehicles driving straight ahead forms multiple vehicle convoys, wherein the time gaps between vehicles of a vehicle convoy are safety time gaps, such that the critical time gaps are formed between two vehicle convoys.

15. The method of claim 3, wherein the line of the vehicles driving straight ahead forms multiple vehicle convoys, wherein the time gaps between vehicles of a vehicle convoy are safety time gaps, such that the critical time gaps are formed between two vehicle convoys.

16. The method of claim 4, wherein the line of the vehicles driving straight ahead forms multiple vehicle convoys, wherein the time gaps between vehicles of a vehicle convoy are safety time gaps, such that the critical time gaps are formed between two vehicle convoys.

17. The method of claim 1, comprising adjusting the number of vehicle convoys $N_{FK}$ per line of vehicles driving straight ahead to the number of vehicles turning left, wherein the following is true for the number of the vehicle convoys $N_{FK}$ and the number of waiting vehicles turning left $N_{IaF}$: $N_{FK}=1$.

18. The method of claim 2, comprising adjusting the number of vehicle convoys $N_{FK}$ per line of vehicles driving straight ahead to the number of vehicles turning left.

19. The method of claim 3, comprising adjusting the number of vehicle convoys $N_{FK}$ per line of vehicles driving straight ahead to the number of vehicles turning left.

20. The method of claim 4, comprising adjusting the number of vehicle convoys $N_{FK}$ per line of vehicles driving straight ahead to the number of vehicles turning left.

* * * * *